United States Patent
Wylde et al.

(10) Patent No.: US 10,494,565 B2
(45) Date of Patent: Dec. 3, 2019

(54) WELL SERVICE FLUID COMPOSITION AND METHOD OF USING MICROEMULSIONS AS FLOWBACK AIDS

(71) Applicant: Clariant International, Ltd., Muttenz (CH)

(72) Inventors: Jonathan Wylde, The Woodlands, TX (US); Amir H. Mahmoudkhani, The Woodlands, TX (US); Martin Bauer, Frankfurt am Main (DE)

(73) Assignee: Clariant International Ltd., Muttenz (CH)

( * ) Notice: Subject to any disclaimer, the term of this patent is extended or adjusted under 35 U.S.C. 154(b) by 0 days.

(21) Appl. No.: 15/511,987

(22) PCT Filed: Sep. 9, 2015

(86) PCT No.: PCT/EP2015/070567
§ 371 (c)(1),
(2) Date: Mar. 16, 2017

(87) PCT Pub. No.: WO2016/041823
PCT Pub. Date: Mar. 24, 2016

(65) Prior Publication Data
US 2017/0292062 A1    Oct. 12, 2017

Related U.S. Application Data

(63) Continuation of application No. 14/491,615, filed on Sep. 19, 2014, now abandoned.

(30) Foreign Application Priority Data

Nov. 25, 2014   (EP) .................................. 14003961

(51) Int. Cl.
*C09K 8/584*  (2006.01)
*B01F 17/00*  (2006.01)
(Continued)

(52) U.S. Cl.
CPC ............ *C09K 8/68* (2013.01); *B01F 17/0042* (2013.01); *C09K 8/584* (2013.01); *C09K 8/602* (2013.01);
(Continued)

(58) Field of Classification Search
CPC .......... C09K 8/584; C09K 8/602; C09K 8/64; C09K 8/68; C09K 8/82; C09K 8/86; C09K 2208/14; B01F 17/0042
See application file for complete search history.

(56) References Cited

U.S. PATENT DOCUMENTS 3,002,923 A    10/1961  Barker et al.
7,380,606 B2   6/2008   Pursley et al.
(Continued)

FOREIGN PATENT DOCUMENTS

CN           1184417 A     6/1998
CN         101056959 A    10/2007
WO       WO 2009/158478   12/2009

OTHER PUBLICATIONS

"Phase behavior studies of quaternary systems containing N-lauroyl-N-methylglucamide/alcohol/alkane/water", Yang et. al., Journal of Colloid and Interface Science, Academic Press, New York, NY, US, vol. 320, No. 1, Feb. 19, 2008, pp. 283-289 (Year: 2008).*

(Continued)

*Primary Examiner* — Aiqun Li
(74) *Attorney, Agent, or Firm* — Tod A. Waldrop

(57) ABSTRACT

The present invention relates to a new Winsor type IV microemulsion system for faster return of well service fluid and enhanced production of hydrocarbon-containing fluids in fractured tight subterranean formations, where the microemulsion system includes a surfactant subsystem including (Continued)

Figure 1:
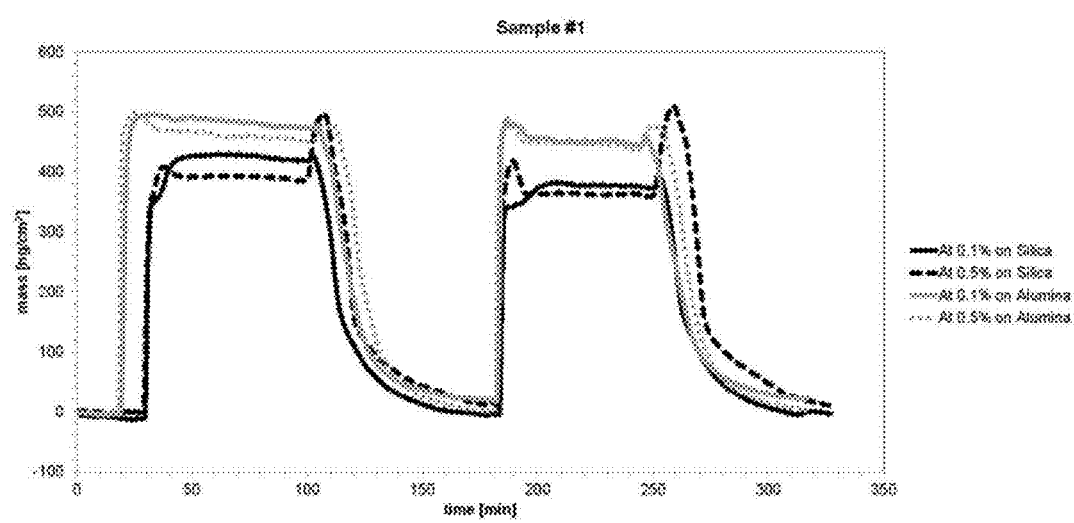

at least one glucamide sugar surfactant, a solvent subsystem and a co-solvent subsystem and to methods for making and using same.

20 Claims, 2 Drawing Sheets

(51) Int. Cl.
    *C09K 8/60*     (2006.01)
    *C09K 8/68*     (2006.01)
    *C09K 8/86*     (2006.01)
    *C09K 8/64*     (2006.01)
    *C09K 8/82*     (2006.01)

(52) U.S. Cl.
    CPC ............... *C09K 8/64* (2013.01); *C09K 8/82* (2013.01); *C09K 8/86* (2013.01)

(56) References Cited

U.S. PATENT DOCUMENTS

| | | |
|---|---|---|
| 7,998,911 B1 | 8/2011 | Berger et al. |
| 8,220,564 B2 | 7/2012 | Kakadjian et al. |
| 2012/0073817 A1 | 3/2012 | van Zanten |
| 2014/0096969 A1 | 4/2014 | Ali |

OTHER PUBLICATIONS

International Search Report for PCT/EP2015/070567, dated Mar. 22, 2016.
International Preliminary Report on Patentability for PCT/EP2015/070567, dated Dec. 23, 2016.
Howard, et al., "Comparison of Flowback Aids: Understanding Their Capillary Pressure and Wetting Properties", SPE Paper 122307, 2009.
Panga, et al., "Wettability Alteration for Water-Block Prevention in High-Prevention in High-Temperature Gas Wells", SPE Paper 100182, 2006.
Pursley, et al., "Microemulsion Additive Enable Optimized Formation Damage Repair and Prevention", SPE Paper 86556, 2004.
Penny, et al., "Field Studies of Drilling and Completion Fluids to Minimize Damage and Enhance Gas Production in Unconventional Reservoirs", SPE Paper 107844, 2007.
Rickman, et al., "Optimizing Microemulsion/surfactant Packages for Shale and Tight-Gas Reservoirs", SPE Paper 131107, 2010.
Yang et al., Journal of Colloid and Interface Science, vol. 320, No. 1, pp. 283-288, Feb. 19, 2008.
Anan Yaghmur et al., Langmuir, vol. 19, No. 4, pa 1063-1068, Feb. 1, 2003.
S.Ezrahi et al., Journal of Colloid and Interface Science, vol. 191, No. 2, pp. 277-290, Jul. 1, 1997.
S. Ray et al., Langmuir, vol. 10, No. 8, pp. 2511-2515, Aug. 1, 1994.
Eliana Areanas et al: Langmuir, vol. 12, No. 2, pp. 588-590, Jan. 1, 1996.
Gregory J. McFann et al, Langmuir, vol. 9, No. 11, pp. 2942-2948, Nov. 1, 1993.
Quintero, et al., "Proper Design Criteria of Microemulsion Treatment fluids for Enhancing Well Production", SPE 144451, 2012.
Bouton et al, Langmuir, vol. 26, No. 11, pp. 7962-7966, Jun. 1, 2010.
Beckwith, R., "Hydraulic Fracturing: The Fuss, The Facts, The Future", Dec. 2010, pp. 34-41.

* cited by examiner

WELL SERVICE FLUID COMPOSITION AND METHOD OF USING MICROEMULSIONS AS FLOWBACK AIDS

FIELD OF INVENTION

This invention involves compositions and a process for treating subterranean reservoirs including but not restricted to shale, tight gas, and coal bed methane, conventional and non-conventional reservoirs using drilling or stimulation.

More particularly, the present invention relates to a new surfactant system for faster return of well service fluid and enhanced production of hydrocarbon-containing fluids in fractured tight subterranean formations, where the surfactant system is a Winsor type IV microemulsion and includes a surfactant subsystem including at least one glucamide sugar surfactant, a solvent subsystem and a co-solvent subsystem and to methods for making and using same.

BACKGROUND OF THE INVENTION

For many years, petroleum products have been recovered from subterranean reservoirs through the use of drilled wells and production equipment. The growing need for oil coupled with the decline in primary production of oil has required the need for more novel and efficient methods of recovering residual oil.

Many flow back aids have been developed and discussed in the prior art to help recover injected fluids after drilling or hydraulic fracturing. General information on hydraulic fracturing may be found in articles by Montgomery, J. Pet. Tech. (2010) 26-32 and by Beckwith, J. Pet. Tech. (2010) 34-41. Flow back aids benefit production by reducing damage due to phase trapping, enhance mobilization of the oil and gas, help to increase the regained permeability and improve the oil/gas recovery.

Flowback aid formulations generally include one or more anionic, nonionic or amphoteric surfactants, along with solvents and co-surfactants that are in the solution or microemulsion form. The various flowback aids are discussed by Howard et al. in SPE paper 122307. Also Panga, et al. discusses the effects of wettability alteration by flowback aids in SPE 100182.

Pursley et al., U.S. Pat. No. 7,380,606 discloses a microemulsion well treatment formed by combining a solvent-surfactant blend with a carrier fluid. In the preferred embodiments, the solvent-surfactant blend includes a surfactant and a solvent selected from the group consisting of terpenes and alkyl or aryl esters of short chain alcohols. Surfactants include ethoxylated castor oil, polyoxyethylene sorbitan monopalmitate and polyethylene glycol. Additionally, isopropyl alcohol and triethylene glycol are used in some cases. Penny and Pursley in SPE 86556 and SPE 107844 give field and laboratory data supporting the effectiveness of microemulsions in low perm shales, coalbed methane and tight sandstone reservoirs. The use and optimization of microemulsion based flowback aids for shale and tight gas reservoirs has also been described by Rickman et al. in SPE 131107.

More recently, microemulsion flowback aids have been published by Berger et al. in U.S. Pat. No. 7,998,911 using a blend of water soluble ester of a low molecular weight alcohol and a low molecular weight organic acid, an oil soluble ester of a low molecular weight alcohol and a high molecular weight fatty acid, one or more water soluble or dispersible nonionic surfactant(s) derived from vegetable or animal sources, one or more anionic or amphoteric surfactant(s) derived from animal or vegetable based sources, and, water.

Another example of a microemulsion system for gas well treatment has been disclosed by Kakdjian et al. in U.S. Pat. No. 8,220,546 which comprises a solvent subsystem, a co-solvent subsystem and a surfactant subsystem comprising at least one monoalkyl branched propoxy sulfate anionic surfactant useful in drilling, producing, remediation, and hydraulic fracturing application to reduce water blocking in reservoir and producing oil and gas wells.

U.S. Pat. No. 3,002,923 teaches a water-in-oil emulsion system that comprises saturated salt water, fuel oil, oil-soluble glucamide surfactants and a free-flowing solids (e,g. bentonite and barium sulfate) serving as drilling muds to remove drill cuttings from bore hole during the construction of a well. The reference teaches a content of the emulsion in glucamides from 1-4 wt.-%, a solvent content of 2-12 wt.-% and a solids content of up to 60 wt.-%.

X. D. Yang et al., Colloid Journal, 2007, Vol. 69, p. 252-258 and Journal of Colloid and Interface Science 320 (2008), 283-289 teach emulsions comprising water, solvents and glucamide surfactants that are Winsor type I, II or III emulsions.

J. Baran et al., Environmental Science and Technology 1996, 30, 2143-2147 teaches that a water/chlorocarbon microemulsion comprising glucamides shows a Winsor type I, II or III behaviour.

Although a number of microemulsion systems for use in oil and gas industry are known in the prior art, there is a continued need for more effective microemulsion systems. Especially there is still a need of flowback aids which are efficient in low concentrations, resistant to high salinities in the reservoirs, stable at higher temperature range which can occur during drilling or stimulation treatments. Such chemical aids are suitable not only for gas well application but also for use in liquid hydrocarbon reservoir applications, and provide very low interfacial tensions that supports maximum reduction of liquid phase trapping and faster fluid return and clean up.

In addition, other undesirable downhole products must be managed by well service fluids during the production of hydrocarbons. For example, scale, paraffins, fines, sulfur, heavy oil tar by-products and water blocks commonly accumulate in and around the formation, well casing, production tubing and recovery equipment. Alternatively, it may be necessary to remove injected fluids from the near wellbore area, such as drilling fluids, cement filtrate, kill fluids, polymers and water blocks. To maintain an efficient recovery of hydrocarbon products, it is frequently necessary to clean or remove these accumulations and deposits. The removal of unwanted deposits from the wellbore and production equipment is generally referred to as "remediation." Microemulsion flowback aids of this invention may be used in remediation applications. In well remediation applications, the selected well treatment microemulsion is preferably injected directly into the wellbore through the production tubing or through the use of coiled tubing or similar delivery mechanisms. Once downhole, the well treatment microemulsion remedies drilling damage, fracturing fluid damage, water blocks and removes fines, asphaltenes and paraffins from the formation and wellbore.

The primary object of the invention is to provide a flowback aid formulation with strong interfacial tension reduction, surface wettability modification and high performance in fluid regain testing and better non-emulsification effect, thus having superior performance to the formulations disclosed in the prior art. Another object of the present invention is to provide a flowback formulation suitable for application under extreme conditions, such as very high salinities as well as high temperatures that are sometimes encountered during drilling and fracturing of oil and gas reservoirs.

It has now been found that a microemulsion from water, at least two solvents and a glucamide surfactant is a particularly effective well treatment fluid when the microemulsion is a Winsor type IV oil-in-water microemulsion.

In a first aspect, the present invention provides a well treatment microemulsion, comprising
water,
2-15 wt.-% of at least one organic solvent with flash point above 37.8° C. (100° F.) and pour point of 10° C. or lower,
1-6 wt.-% of at least one co-solvent that includes at least one alcohol, and
12-30 wt.-% of at least one N-Alkyl-N-acylglucamine surfactant,
which is a Winsor type IV emulsion.

In another aspect, this invention relates to a process for recovering fluids during fracturing operations, the process comprising injecting a microemulsion according to this invention into the fractured formation.

In another aspect, this invention relates to a process for stimulating an oil or gas well, comprising injection of water and the microemulsion according to the invention.

In another aspect, this invention relates to the use of the microemulsion according to the invention as flowback aid during fracturing operations.

In another aspect, this invention relates to the use of the microemulsion according to the invention in stimulating an oil or gas well by water injection.

In this specification, the expression "microemulsion system" with respect to this invention shall mean a system of water, oil and an amphiphile which is a single optically isotropic and thermodynamically stable liquid solution and is Winsor type IV. In some respects, microemulsions can be considered as small-scale versions of emulsions, i.e., droplet type dispersions either of oil-in-water (o/w) or of water-in-oil (w/o), with a size range in the order of 5-50 nm in droplet radius, suitable for increasing gas and/or oil production and water recovery. Microemulsions, are thermodynamically stable compositions and are formed spontaneously or with gentle agitation once the correct composition is reached. They have potentially infinite lifetimes depending on storage conditions. Other distinctions include droplet size and the color of the system. Conventional emulsions generally have spherical droplets with diameters large enough to scatter white light and are therefore opaque in appearance, whereas microemulsions have droplet sizes of 50 nm or less and are transparent or have slightly bluish tinge. The expression "surfactant subsystem" shall mean one or more surfactants suitable for use in the microemulsion. The expression "solvent subsystem" shall mean one or more solvents suitable for use in the microemulsion. The expression "co-solvent subsystem" shall mean one or more co-solvents suitable for use in the microemulsion.

According to Winsor, there are four types of microemulsion phases that exist in equilibria; these phases are referred to as Winsor type I to IV phases:
1. Winsor I: With two phases, the lower (o/w) microemulsion phases in equilibrium with the upper excess oil.
2. Winsor II: With two phases, the upper microemulsion phase (w/o) microemulsion phases in equilibrium with lower excess water.
3. Winsor III: with three phases, middle microemulsion phase (o/w plus w/o, called bicontinous) in equilibrium with upper excess oil and lower excess water.
4. Winsor IV: In single optically pure phase, with oil, water and surfactant homogenously mixed.

The instant invention relates to type IV microemulsions. These differ from type I, II or III microemulsions in that type IV microemulsions contain water, a non-aqueous fluid and a surfactant in a single phase. In type IV microemulsions no phase separation occurs over an extended time. The composition of the instant invention therefore is a microemulsion formed from water, at least one solvent, at least one co-solvent and a glucamide containing surfactant that is present in a single phase. For properties of microemulsions, reference in made to SPE paper 173729.

The inventors have found that new thermodynamically stable, microemulsion systems of Winsor type IV including a surfactant subsystem, a solvent subsystem and water, where the systems are substantially optically isotropic, are capable of increasing gas and/or oil production and water recovery. The new microemulsion systems and uses thereof afford faster fluid return and clean up and enhanced production in fractured tight gas and oil subterranean formations. The inventors have found that by including N-Alkyl-N-acylglucamine sugar surfactants or the cyclic N-Alkyl-N-acylglucamine derivatives into the surfactant subsystem of a microemulsion system the performance characteristics of the microemulsion system could be enhanced. Especially the interfacial tension reduction, the resistance against high salinity and stability at elevated temperatures could be improved compared to prior art microemulsion systems.

In certain embodiments, the new thermodynamically stable, microemulsion systems include a nonionic surfactant or a plurality of nonionic surfactants, an anionic surfactant or a plurality of anionic surfactants, a co-solvent subsystem, and a solvent system including heavy aromatic naphtha, paraffinic base oils or methylated fatty acids and water, where nonionic surfactant or surfactants includes glucamides or their cyclic derivatives.

The flowback aid composition of the present invention preferably includes the components a) to e) as follows:
a) a surfactant including at least one N-Alkyl-N-acylglucamine according to formula (I)

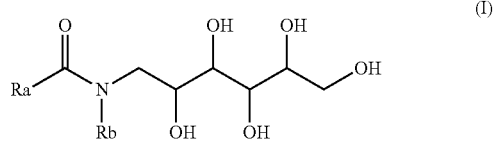

wherein
Ra is a linear or branched, saturated or unsaturated $C_5$-$C_{21}$-hydrocarbon residue, preferably a $C_7$-$C_{13}$-hydrocarbon residue, and
Rb is a $C_1$-$C_4$ alkyl residue, preferably methyl.

In another preferred embodiment, the N-Alkyl-N-acylglucamines (I) comprise at least 50 wt.-% of the total amount of N-Alkyl-N-acylglucamines (I) compounds with $C_7$-$C_9$-alkyl residue and up to 50 wt-% of the total amount of N-Alkyl-N-acylglucamines (I) compound with $C_{11}$-$C_{13}$-alkyl residue.

In another preferred embodiment, the surfactant includes at least one cyclic N-Alkyl-N-acylglucamine of the formulae (II), (III) and (IV)

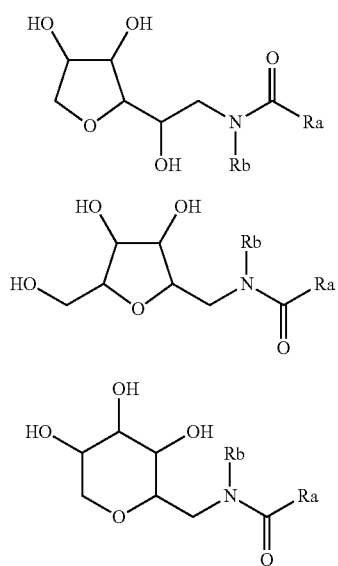

wherein
Ra is a linear or branched, saturated or unsaturated $C_5$-$C_{21}$-alkyl residue, preferably a $C_7$-$C_{13}$-alkyl residue, and
Rb is a $C_1$-$C_4$-alkyl residue, preferably methyl.

In another preferred embodiment, the cyclic N-Alkyl-N-acylglucamines (II; III; IV) comprise at least 50 wt.-% of the total amount of cyclic N-Alkyl-N-acylglucamines (II; III; IV) compounds with $C_7$-$C_9$-alkyl residue and up to 50 wt.-% of the total amount of cyclic N-Alkyl-N-acylglucamines (II; III; IV) compound with $C_{11}$-$C_{13}$-alkyl residue.

The surfactant may additionally include non-ionic co-surfactants, such as linear or nonlinear ethoxylated alcohols, alkyl polyglycosides, castor oil ethoxylates, sorbitan ester derivatives or ethylene oxide/propylene oxide block copolymers. The preferred co-surfactants have an HLB value between about 5 and about 15. The surfactant may further include at least one anionic or amphoteric surfactant, such as alkylethersulfates, carboxy ether sulfates, sodium alkyl sulfosuccinates, sodium di-alkyl sulfosuccinates, alkylamidopropyl betaines and alkyl amine oxides.

b) A first solvent including at least one organic solvent with flash point above 37.8° C. (100° F.) and pour point of 10° C. or lower. In one preferred embodiment, the organic solvent can include naphthalene depleted alkyl arenes or a mixture thereof. In other embodiments, the organic solvent includes a terpene or a mixture of terpenes. Other embodiments use mineral oils, preferably paraffinic base oils. In yet another embodiment the organic solvent includes alkyl esters of fatty esters, in particular rapeseed oil methylester can be employed. In another embodiment, the solvent is a butyl glycol ether preferably having 1-10 ethoxy groups.

c) A co-solvent, including at least one alcohol. In a preferred embodiment, this alcohol being the co-solvent may be a monohydric alcohol with a $C_1$-$C_{20}$-alkyl residue or a diol with a $C_2$-$C_{20}$-alkylene residue. It is believed to serve as a coupling agent between the solvent and the surfactant, thereby stabilizing the microemulsion. The alcohol also lowers the freezing point of the well treatment microemulsion. Although propylene glycol is presently more preferred, alternative suitable alcohols include midrange primary, secondary and tertiary monohydric alcohols and diols with between 1 and 20 carbon atoms, more preferably 2 to 10 carbon atoms, such as isopropanol, t-butanol, n-butanol, n-pentanol, n-hexanol, n-octanol and pentane-diol.

d) Optionally a mutual solvent selected from the group consisting of 2-ethyl-hexanol, ethylene glycol ether of 2 ethyl-hexanol, polyethylene glycol ethers of 2 ethyl-hexanol, butyl glycol ether and propylene glycols for better coupling between solvent and the surfactant and lowering the freezing point of the microemulsion system. Said glycol ethers will comprise preferably 1 to 10 alkylene oxy units, e.g. ethoxy or propoxy units.

e) Water, whereas the water can be fresh water, produced water or brine.

The composition of the present invention is preferably prepared by combining the N-Alkyl-N-acylglucamine surfactant, optionally the co-surfactant, of the first solvent, the co-solvent, optionally the mutual solvent, with the remainder being water. The mutual solvent and other compounds including but not limited to polyglycolethers may be added to improve stability and performance when necessary.

The inventive composition comprises 12-30 wt.-%, preferably 14-25 wt.-% of at least one N-Alkyl-N-acylglucamine surfactant.

The inventive composition comprises 2-15 wt.-%, preferably 5-10 wt.-% of at least one organic solvent with flash point above 37.8° C. (100° F.) and pour point of 10° C. or lower.

The inventive composition comprises 1-6 wt.-%, preferably 3-5 wt.-% of at least one co-solvent including at least one alcohol.

If present, the inventive composition comprises up to 10 wt.-%, preferably 4-10 wt.-%, more preferably 3-5 wt.-% of at least one co-surfactant.

If present, the inventive composition comprises up to 10 wt.-%, preferably 4-10 wt.-%, more preferably 3-5 wt.-% of at least one mutual solvent.

The remainder of the composition may be water.

If no Winsor type IV emulsion is formed directly, this can be remedied by increasing surfactant concentration and/or changing or reducing solvent content within the limits given above.

The microemulsions of this invention are adapted to be added to water-based fracturing fluids for stimulation of oil and gas bearing formations in concentrations between about 0.1 gptg (gallons per thousand gallons) and about 10 gptg depending on reservoir conditions to obtain the desired flowback performance. At this concentration range, the microemulsion improves removal of water block or well service fluid block (speeds up the removal of water blocks) thereby improving hydrocarbon production. Most of the commercially available microemulsions for these applications have been formulated with only non-ionic surfactants having a cloud point for either the mother solution or the treating solution of only 150° F. or lower, whereas many anionic systems are not resistant to high salinities. Another problem related to the systems according to the state of the art is that the interfacial tension reduction is insufficient in order to provide for faster flowback.

The present invention also involves a process for the treatment of conventional and non-conventional oil and gas reservoirs using the microemulsions above including but are not limited to drilling and stimulation of subterranean reservoirs including but not restricted to shale oil or gas, tight oil or gas, or coal bed methane. In general conventional oil and gas are easier and cheaper to produce than unconventional oil and gas. For example it is easier to produce oil from high permeability reservoir (>10 mD) than low permeability one (<1 mD). A reference on conventional and unconventional reservoirs can be found in SPE paper 152596.

The composition of the present invention is used at 0.1 to 10 gallons per thousand gallons of injected well treatment fluid. In most common application 1 to 5 gallons per thousand gallons may be used. The injected fluid may be fresh water, produced water, KCl solution, NaCl solution, acid solution or the combination of two or more of these. In general any aqueous fluid used for fracturing may be employed. The microemulsion of this invention is added to the injected fluid into the formation to reduce surface and interfacial tension and/or increase wettability to water allowing enhanced fluid recovery during drilling or stimulation processes. The injection fluid may contain, in addition to the microemulsion, other ingredients known to those familiar with the art including but not restricted to corrosion inhibitors, acids, dispersants, gelling agents, lubricity agents, oxygen scavengers, scale inhibitors, biocides, friction reducers, crosslinker, surfactants, pH adjuster, iron control agents, sands or ceramic proppants and gel breakers.

Employing the microemulsion improves penetration into the reservoir, allows better drainage and flowback, improves load recovery, and reduces formation damage due to fluid trapping, in addition to providing a safer solution to existing flowback aids due to lower toxicity and higher biodegradability. Other applications of the microemulsion include reservoir wettability alteration, well cleanout and work-over.

EXAMPLES

In this specification, all percentages refer to % by weight if not otherwise noted.

Example 1: Composition

An overview of different compositional aspects of this invention is given in Table 1.

The different materials are as follows:
a) water is either potable or 3 wt.-% KCl solution;
b) solvents Caromax® 20 LN is naphthalene depleted heavy aromatic naphtha, Sipdril® 1LV is a paraffinic base oil, FAME is rape seed oil methyl ester;
c) the glucamide $C_8$-$C_{10}$, $C_8$-$C_{14}$ and $C_8$-$C_{18}$ is a N-Alkyl-N-acylglucamine with $C_8$-$C_{10}$, $C_8$-$C_{14}$ and $C_8$-$C_{18}$ alkyl chain length respectively, as main surfactant component with high cloud point and insensitive to high salinities;
d) Genapol® X 060, LA040, UD30 and UD110 are ethoxylated alcohols with isotridecyl chain and six moles of ethylene oxide (EO), $C_{12}$-$C_{14}$ alkyl chain with 4 moles of ethylene oxide (EO), undecyl chain with 3 and 11 moles of ethylene oxide, respectively, and are used as co-surfactants;
e) Propylene glycol, Polyethylene glycol (PEG-400), Polypropyleneglycol (PPG) and SURFTREAT® 9173 are used as co-solvents to adjust the viscosity and to decrease the freezing point and defoamer;
f) iso-Propanol, 1-octanol or pentandiol are used as alcohols to adjust the viscosity and improve compatibility.

Microemulsion based flowback aid formulations illustrating different compositional aspects of this invention are listed in Table 1. All inventive microemulsions are Winsor type IV oil-in-water emulsions.

TABLE 1

List of compositions for selected samples of this invention.

| | | Sample no. | | | |
|---|---|---|---|---|---|
| | | # 1 | # 2 | # 3 | # 4 |
| Water | [wt.-%] | 28 | 48 | 31.5 | 31 |
| Caromax 20 LN | [wt.-%] | 12 | 12 | 0 | 0 |
| Sipdril 1LV | [wt.-%] | 0 | 0 | 10 | 0 |
| FAME | [wt.-%] | 0 | 0 | 0 | 10 |
| Glucamide $C_{8-14}$ | [wt.-%] | 28 | 28 | 28 | 25 |
| Genapol X060 | [wt.-%] | 7 | 7 | 7 | 0 |
| Genapol UD30 | [wt.-%] | 0 | 0 | 2.1 | 0 |
| Genapol UD110 | [wt.-%] | 0 | 0 | 3.4 | 0 |
| Alfonic $C_{8-10}$ 4.5 EO | [wt.-%] | 0 | 0 | 0 | 10 |
| Propylene glycol | [wt.-%] | 0 | 5 | 3 | 20 |
| iPrOH | [wt.-%] | 10 | 0 | 0 | 0 |
| 1-Octanol | [wt.-%] | 0 | 0 | 4 | 4 |
| PEG-400 | [wt.-%] | 15 | 0 | 0 | 0 |
| SURFTREAT 9173 | [wt.-%] | 0 | 0 | 16.5 | 0 |

Example 2: Effect of the Flowback Aid on the Fluid Recovery in a Proppant Pack

Sand packed columns are used to simulate fluid recovery in a proppant pack. $N_2$ gas at a constant flow rate of 80 mL/min was used to apply pressure and displace the fluid through the column, which would mimic the reservoir gas in the field forcing the fracturing fluid through the formation and into the wellbore. A threaded standard Chromaflex® glass column 30 cm long with an internal diameter of 2.5 cm is used. Each end is supplied with two PTFE end fittings with 20 μm porosity polyethylene bed supports to prevent fines from the sand pack from plugging the line. Samples of 275 g Thor's LiteProp 20/40 mesh ceramic proppant sand (Thorsoil) are required to pack the column. 100 g samples of the base fluid with 1, 5, and 10 gptg were prepared. 70-75 g of the fluid are needed to completely saturate the proppant pack with fluid. The performance test was carried out with base fluid (7% KCl solution in water) without any flowback aid, and base fluid containing the formulations of the present invention. A lab balance was used to record the weight of the fluid collected from the sand column. Each of the concentrations has been measured 3 times and the average is reported. A test was considered complete when a minimal change in fluid recovery was observed (less than 0.2 g in 15 min).

The results are listed in Table 2 to evaluate improvement in fluid recovery with the glucamide based flowback aids (results are shown for samples 1-4). The results show higher fluid regain compared to those in the absence of additive clearly demonstrates superior performance of formulations of the present invention.

TABLE 2

Effect of the flowback aids on the fluid recovery in a proppant pack (regain permeability test)

| Additive | Flow back aid concentration [gptg] | Fluid Recovery [%] |
|---|---|---|
| None | 0 | 12.80 (potable water) |
| | 0 | 21.50 (3% KCl solution) |
| Chemical A | 1 | 30.00 |
| (U.S. Pat. No. 7,998,911 | 5 | 38.80 |
| B1, Example 1) | 10 | 45.00 |
| (comp.) | | |

TABLE 2-continued

Effect of the flowback aids on the fluid recovery in a proppant pack (regain permeability test)

| Additive | Flow back aid concentration [gptg] | Fluid Recovery [%] |
|---|---|---|
| Chemical B (U.S. Pat. No. 8,220,546 B2, Sample #9) (comp.) | 1 | 28.00 |
|  | 5 | 43.00 |
|  | 10 | 79.00 |
| Chemical C (U.S. Pat. No. 7,380,606 B2) (comp.) | 1 | 63.10 |
|  | 5 | 79.00 |
|  | 10 | 79.40 |
| Sample #1 | 1 | 79.60 |
|  | 5 | 84.20 |
|  | 10 | 86.70 |
| Sample #2 | 1 | 72.00 |
|  | 5 | 81.00 |
|  | 10 | 83.00 |
| Sample #3 | 1 | 75.00 |
|  | 5 | 82.10 |
|  | 10 | 85.70 |
| Sample #4 | 1 | 76.00 |
|  | 5 | 82.20 |
|  | 10 | 84.60 |

An additional test has been made with the composition from Example 3 of U.S. Pat. No. 3,002,923. The composition obtained was a Winsor type II emulsion with an upper emulsion phase and a lower aqueous phase that was unsuitable for use as a flowback aid.

Chemical C according to U.S. Pat. No. 7,380,606 corresponded to inventive example 3, wherein the glucamide was replaced with the preferred surfactant taught in U.S. Pat. No. 7,380,606, col. 3, lines 3 to 5.

Example 3: Surface and Interfacial Tension Reduction

Surface tension measurements are carried out with a Krüss Tensiometer using the Du Noüy ring method. Interfacial tension measurements are carried out with a LAUDA drop volume tensiometer TVT 2 using low aromatic white spirit (LAWS) as test oil. Table 3 shows the surface tension of base fluid (7% KCl potable water solution) without any flowback aid, base fluid containing (1 gptg) of formulations in the present invention. Furthermore Table 3 shows the interfacial tension of base fluid (7% KCl potable water solution) without any flowback aid, base fluid containing (1 gptg) the formulations of the present invention against the test oil low aromatic white spirit (LAWS). The data clearly show that the glucamide based flowback aids of the present invention provide a large surface tension and interfacial tension reduction. The ability to reduce surface and interfacial tension is a key property in order to provide maximum phase trapping reduction, fast fluid return and clean up and reduce reservoir damage.

TABLE 3

Effect of 1 gptg of the flowback aid on surface tension and interfacial tension of LAWS in 3 wt.-% KCl solution

| Additive | Surface Tension [mN/m] | Interfacial Tension [mN/m] |
|---|---|---|
| None | 72.0 | 16.0 |
| Chemical A (U.S. Pat. No. 7,998,911 B1, Example 1) | 28.1 | 1.4 |
| Chemical B (U.S. Pat. No. 8,220,546 B2, Sample #9) | 28.2 | 7.3 |
| Chemical C (U.S. Pat. No. 7,380,606 B2) | 28.8 | 2.0 |
| Sample #1 | 25.3 | 0.2 |
| Sample #2 | 26.1 | 0.5 |
| Sample #3 | 26.3 | 0.3 |
| Sample #4 | 26.2 | 0.4 |

Example 4: Contact Angle Modification

Formulations appropriate for use as flowback aids need to modify wettability of solid surfaces to more water-wet. Contact angle measurements provide a good tool to investigate the ability to modify the interfacial properties between solid-liquid. Quartz has been chosen as a model surface for reservoir stone. Contact angle measurements were recorded using Krüss DSA 10 MK2 goniometer. All measurements were conducted with 20 µl drops. Contact angle measurements were taken every second for 30 s. At minimum three measurements were performed and the average of these measurements is reported.

Table 4 shows that the microemulsion based flowback aids of the present invention provide for a substantial decrease of contact angle compared to water with no additive. The ability of contact angle modification is a key parameter for providing strong capillary pressure reduction and thus removing water blocks.

TABLE 4

Contact angle modification on quartz surface for flowback aids in 3 wt.-% KCl solution

| Additive | Concentration [gptg] | Contact Angle |
|---|---|---|
| None | — | 41 |
| Chemical A (U.S. Pat. No. 7,998,911 B1, Example 1) | 1 | 33 |
|  | 5 | 22 |
|  | 10 | 21 |
| Chemical B (U.S. Pat. No. 8,220,546 B2, Sample #9) | 1 | 29 |
|  | 5 | 30 |
|  | 10 | 29 |
| Chemical C (U.S. Pat. No. 7,380,606 B2) | 1 | 31 |
|  | 5 | 25 |
|  | 10 | 24 |
| Sample #1 | 1 | 28 |
|  | 5 | 21 |
|  | 10 | 5 |
| Sample #2 | 1 | 37 |
|  | 5 | 28 |
|  | 10 | 16 |
| Sample #3 | 1 | 35 |
|  | 5 | 25 |
|  | 10 | 21 |
| Sample #4 | 1 | 31 |
|  | 5 | 24 |
|  | 10 | 18 |

Example 5: QCM-D Adsorption Measurements

Quartz Crystal Microbalance with Dissipation monitoring, QCM-D, is an analytical tool to characterize the formation of thin films (nm). The instrument is based on a sensor that oscillates at a specific frequency when voltage is applied. The frequency of the oscillation changes as the mass on the sensor changes.

QCM-D measurements were carried out in order to study the adsorption behavior of the microemulsion systems of this invention on surfaces. Experiments have been carried out on Silica and Alumina surfaces as models for the surfaces encountered in real reservoirs. All QCM-D measurements were performed on a Q-sense E4. Using the E4 instrument the frequency change of the sensor caused by the molecular adsorption at the sensor surface can be determined. Using the QTool software the sensor signal can then be converted into adsorbed mass and viscoelastic properties of the molecular layers which build up at the sensor surface.

The measurements were made at 22° C. using silica and alumina sensors obtained from Q-Sense. In order to get a reliable measurement, following cleaning protocol has been adopted. The silica and alumina coated quartz sensors were rinsed with excess deionized water. Then they were place in a suitable holder and placed in a 3 wt.-% Hellmanex III cleaning solution (purchased at Hellma-Analytics) and sonicated in an ultra-sound bath for 30 min. After that the crystals are rinsed with deionized water and dried with pressurized air.

Two concentrations 1 gptg and 5 gptg have been measured. Every run consist of a 2 adsorption/desorption cycles (adsorption of sample followed by washing with deionized water=1 cycle). The solution is pumped at a constant flow rate of 200 μL/min.

FIG. 1 shows that the microemulsion based flowback aid of the present invention is readily adsorbed to both tested surfaces until adsorption/desorption equilibrium is reached for a threshold of 400-500 ng/cm$^2$. Upon flushing with water the flowback aid is completely desorbed. The data clearly show that the glucamide based flowback aids of the present invention provide the necessary surface modification upon application while no reservoir retention which is important for reduction of reservoir damage. Furthermore the complete reversibility of adsorption is a key feature leaving the reservoir rock properties unchanged after the treatment is finished to provide for maximum hydrocarbon production.

Example 6: Rheological Behavior of Formulations

During the hydraulic fracturing process high pressures are applied leading to occurrence of high shear-rates to which the fracturing fluid is exposed. This can sometimes lead to undesired change of properties or phase changes induced by high shear stress. In order to probe the behavior upon high shear rates of the microemulsion based flowback aids of the present invention the flow properties at 23° C. were measured with a rotation viscometer Haake Rheostress 6000 with cylinder geometry. 3.0 ml of sample was placed into the measurement cell and the flow behavior has been screened for shear rates between 10-1000 s$^{-1}$.

Figure 2:
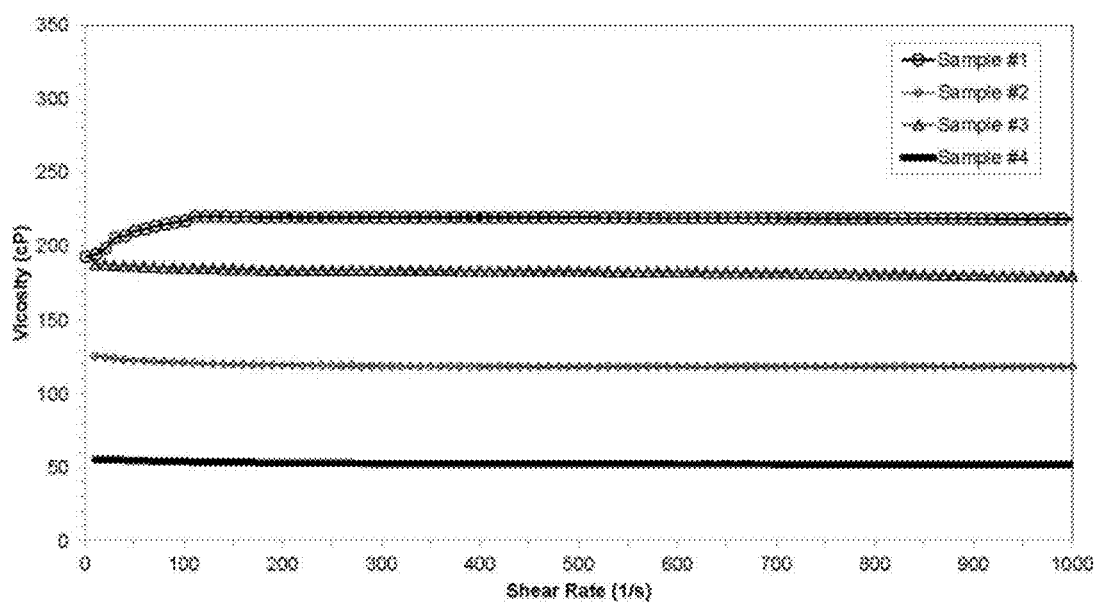

FIG. 2 shows the rheological behavior of the microemulsion systems of this invention for applied shear rate between 10-1000 s$^{-1}$. The flow properties of the flowback aids of this invention remain unchanged and Newtonian behavior can be observed for the whole shear rate range. This demonstrates that the microemulsion systems of this invention are stable at shear rates occurring under the high pressures applied during hydraulic fracturing processes. Also for high shear rates the microemulsion systems of this invention remain their desired properties for maximum phase trapping reduction, fast fluid return and clean up and reduction of reservoir damage.

The invention claimed is:

1. A microemulsion comprising
   water,
   2-15 wt.-% of at least one organic solvent with flash point above 37.8° C. and pour point of 10° C. or lower,
   1-6 wt.-% of at least one co-solvent that includes at least one alcohol, and
   12-30 wt.-% of at least one N-Alkyl-N-acylglucamine surfactant,
   wherein the microemulsion is a Winsor type IV microemulsion.

2. The microemulsion according to claim 1, wherein the glucamide surfactant is a compound of formula (I)

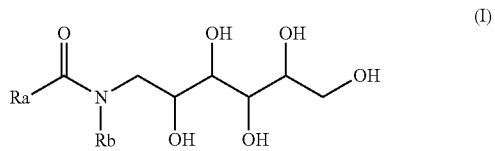

wherein
Ra is a $C_5$-$C_{21}$-hydrocarbon residue, and
Rb is a $C_1$-$C_4$-alkyl group.

3. The microemulsion according to claim 2, wherein Ra is $C_7$ to $C_{15}$ hydrocarbon.

4. The microemulsion according to claim 2, wherein Ra is an aliphatic group.

5. The microemulsion according to claim 2, wherein Ra is alkyl or alkenyl.

6. The microemulsion according to claim 2, wherein Rb is methyl.

7. The microemulsion according to claim 2, wherein in at least 50 wt.-% of the total amount of compounds according to formula (I) Ra is $C_7$ to $C_9$ alkyl and in up to 50 wt.-% Ra is $C_{11}$ to $C_{13}$ alkyl.

8. The microemulsion according to claim 1, wherein the at least one organic solvent is selected from the group consisting of naphthalene depleted alkyl arenes, terpenes, paraffinic solvents, fatty acid alkyl esters and butyl glycol ethers.

9. The microemulsion according to claim 1, wherein the at least one co-solvent is selected from the group consisting of primary, secondary or tertiary monoalcohols having from 1-20 carbon atoms, and diols having from 1-20 carbon atoms.

10. The microemulsion according to claim 1, wherein the at least one co-solvent is selected from the group consisting of propylene glycol, isopropanol, t-butanol, n-butanol, n-pentanol, n-hexanol, n-octanol and pentane-diol.

11. The microemulsion according to claim 1, further comprising a mutual solvent selected from the group consisting of 2-ethylhexanol, ethers of 2-ethylhexanol with ethylene glycol, polyethylene glycols, propylene glycol, and mixtures thereof.

12. The microemulsion according to claim 1, comprising 14-25 wt.-% of the at least one N-Alkyl-N-acylglucamine surfactant.

13. The microemulsion according to claim 1, comprising 3-5 wt.-% of the at least one co-solvent.

14. The microemulsion according to claim 1, comprising 5-10 wt.-% of the at least one organic solvent.

15. The microemulsion according to claim 1, further comprising up to 10 wt.-% of a mutual solvent.

16. The microemulsion according to claim 1, comprising water as the balance to 100 wt. %.

17. A process for recovering fluids during fracturing operations, the process comprising injecting a microemulsion comprising
- water,
- 2-15 wt.-% of at least one organic solvent with flash point above 37.8° C. and pour point of 10° C. or lower,
- 1-6 wt.-% of at least one co-solvent that includes at least one alcohol, and
- 12-30 wt.-% of at least one N-Alkyl-N-acylglucamine surfactant, wherein the microemulsion is a Winsor type IV microemulsion into the fractured formation.

18. The process according to claim 17, wherein the amount of microemulsion is 0.1 to 10 gallons of microemulsion per thousand gallons of fracturing fluid.

19. A process for stimulating an oil or gas well, comprising injection of water and a microemulsion comprising
- water,
- 2-15 wt.-% of at least one organic solvent with flash point above 37.8° C. and pour point of 10° C. or lower,
- 1-6 wt.-% of at least one co-solvent that includes at least one alcohol, and
- 12-30 wt.-% of at least one N-Alkyl-N-acylglucamine surfactant, wherein the microemulsion is a Winsor type IV microemulsion, into the oil or gas well.

20. The process according to claim 19, wherein 0.1 to 10 gallons of microemulsion are used per 1000 gallons of water (0.01-1% by volume).

* * * * *